United States Patent [19]

Howard et al.

[11] 4,447,271
[45] May 8, 1984

[54] PIGMENTS AND THEIR PREPARATION BY COATING WITH OXIDES OF SI-ZR-AL

[75] Inventors: Peter B. Howard; Derek O'Donnell, both of Cleveland, England

[73] Assignee: Tioxide Group PLC, Cleveland, England

[21] Appl. No.: 428,788

[22] Filed: Sep. 30, 1982

[30] Foreign Application Priority Data

Oct. 30, 1981 [GB] United Kingdom ................ 8132845

[51] Int. Cl.³ .............................................. C09C 1/36
[52] U.S. Cl. ............................... 106/300; 106/308 B; 106/309
[58] Field of Search ...................... 106/308 B, 300, 309

[56] References Cited

U.S. PATENT DOCUMENTS

| Re. 27,818 | 11/1973 | Werner | 106/300 |
|---|---|---|---|
| 2,885,366 | 5/1959 | Iler | 106/300 |
| 3,552,995 | 1/1971 | Powell | 106/308 B |
| 3,650,793 | 3/1972 | Goodspeed et al. | 106/308 B |
| 4,125,412 | 11/1978 | West | 106/300 |
| 4,222,789 | 9/1980 | Jacobson | 106/300 |
| 4,328,040 | 5/1982 | Panek et al. | 106/308 B |

FOREIGN PATENT DOCUMENTS

| 990457 | 6/1976 | Canada | 106/300 |
|---|---|---|---|
| 1179171 | 1/1970 | United Kingdom | |
| 1368601 | 10/1974 | United Kingdom | 106/300 |
| 1507710 | 4/1976 | United Kingdom | |
| 1435718 | 5/1976 | United Kingdom | |
| 1541621 | 3/1979 | United Kingdom | |
| 1589070 | 5/1981 | United Kingdom | |

Primary Examiner—Helen M. McCarthy
Attorney, Agent, or Firm—Banner, Birch, McKie & Beckett

[57] ABSTRACT

Titanium dioxide pigment having a high durability when used in paints comprises a particulate core of rutile titanium dioxide having an inner coating of dense amorphous silica on which is carried an outer coating of a hydrous oxide of zirconium. Optionally the pigment has an outer coating of a hydrous oxide of aluminum.

The amount of dense amorphous silica is up to 12% by weight expressed as $SiO_2$ and the amount of hydrous oxide of zirconium is up to 5% expressed as $ZrO_2$ on the weight of $TiO_2$. The outer coating of hydrous oxide of aluminium can be present in an amount of up to 6% by weight expressed as $Al_2O_3$ on the weight of $TiO_2$.

A combination of these coatings has been found to be extremely advantageous in producing a paint containing the pigment having a very good durability and resistance to weathering.

11 Claims, No Drawings

PIGMENTS AND THEIR PREPARATION BY COATING WITH OXIDES OF SI-ZR-AL

This invention relates to improved pigments and to their preparation and particularly to titanium dioxide pigments.

Titanium dioxide pigments, particularly rutile titanium dioxide, are valuable materials for use in pigmenting a wide variety of products, including paints, which in use are required to exhibit a high degree of so-called durability in withstanding degradation of the product by the action of light. There is a desire always for improvements in pigments and paint media to increase the durability and to extend the effective life of the products.

According to the present invention a titanium dioxide pigment of improved durability comprises particulate pigmentary titanium dioxide having an inner coating on a core of rutile titanium dioxide of dense amorphous silica in an amount of up to 12% by weight expressed as $SiO_2$ on weight of $TiO_2$ and, carried on the inner coating, a coating of a hydrous oxide of zirconium in an amount of up to 5% by weight expressed as $ZrO_2$ on weight of $TiO_2$ and optionally an outer coating containing a hydrous oxide of aluminum in an amount of up to 6% by weight expressed as $Al_2O_3$ on weight of $TiO_2$.

The present invention provides a pigment having an improved resistance to photochemical degradation i.e. a pigment having an improved durability. The coating of the core of pigmentary rutile titanium dioxide with a dense inner coating of silica and then with a coating of a hydrous oxide of zirconium improves the durability of the pigment by a margin which will be unexpected to those skilled in the properties of titanium dioxide pigments.

The coating of dense silica is substantially non-porous, amorphous and continuous over the particle. The coating of dense silica is formed from an alkaline solution and preferably from a solution of a soluble silicate at a pH greater than 8, most preferably at a pH of from 9 to 11.

The deposition of the dense silica results from the addition to an alkaline solution of the soluble silicate of a mineral acid such as sulphuric acid which hydrolyses the silicate in solution to hydrous amorphous silica. For instance a solution of a soluble silicate can be mixed with an alkaline slurry or dispersion of core particles of pigmentary titanium dioxide and then slowly acidified to deposit dense amorphous silica.

Alternatively there can be added to a slurry or dispersion of core particles of titanium dioxide an alkaline solution of a water-soluble silicate and simultaneously a mineral acid to maintain the pH of the slurry at a value greater than 8, say 9 to 10.5 to form and deposit the required dense silica coating.

Generally the temperature of the slurry is maintained at from 60° C. to 100° C., preferably from 70° C. to 90° C. during deposition of dense silica and the slurry will be stirred to maintain effective coating.

Any suitable water soluble silicate can be used as the source of dense silica although preferably an alkali metal silicate is employed. Particularly useful are sodium and potassium silicates.

The chosen core particles are formed by either the "sulphate" (in which the product has been calcined) or, preferably, by the "chloride" process for the manufacture of titanium dioxide pigments operated in such a way as to produce a product of pigmentary size in which the majority of the titanium dioxide is in the rutile modification. Usually at least 95% by weight of the titanium dioxide is rutile and preferably at least 97% is of the rutile modification. The "chloride" process involves the vapour phase oxidation of a titanium halide to produce directly pigmentary titanium dioxide (often referred to as pyrogenic titanium dioxide).

The core material obtained by the "chloride" or "sulphate" process usually will be in the form of a dry reactor discharge in the case of the "chloride" process or a dry calciner discharge in the case of the "sulphate" process. The core material can be milled, if desired, by, for example, fluid energy milling with steam prior to formation into an aqueous dispersion.

Some core materials produced by the "chloride" process are self-dispersing on agitation with water whereas others are more easily dispersed by agitation in the presence of a dispersing agent as are "sulphate" produced core materials. Suitable dispersing agents are inorganic or organic compounds such as alkali metal silicates e.g. sodium silicate, phosphates such as the hexametaphosphates and amines such as monoisopropylamine.

The aqueous dispersion or slurry of the core material can be milled prior to the deposition of the dense amorphous silica. The milling can be carried out by any suitable wet milling process such as in a bead mill but it is preferred to mill the aqueous dispersion in a sand mill. Usually milling of the aqueous dispersion will only be carried out in those cases where the core material has not been milled previously but this need not necessarily be so.

After coating of the core material with the dense amorphous silica the coated core is then treated with a hydrous oxide of zirconium and usually this is carried out in an aqueous dispersion by adding to the dispersion a suitable water-soluble zirconium compound which on reaction with an acid or alkali deposits the required hydrous zirconium oxide. Although for the purposes of this invention it is stated that the core material carries a coating of the hydrous oxide of zirconium on the inner coating of dense amorphous silica it is to be clearly understood that this includes those products in which the hydrous oxide of zirconium is associated with the coated core material and need not necessarily surround the whole of the inner coating.

Typical acid zirconium compounds which may be employed in the invention are the mineral acid salts of zirconium such as the salts of sulphuric and nitric acids with zirconium sulphate being the most preferred source. Alternatively ammonium or alkali metal zirconium salts such as ammonium zirconium carbonate can be employed.

Optionally an outer coating of a hydrous oxide of aluminum is provided on the coating of the hydrous oxide of zirconium. It is to be understood that while a coating of the hydrous oxide of aluminium is referred to this hydrous oxide need not necessarily be in the form of a coating and includes the case where the hydrous oxide is associated with the pigment.

The hydrous oxide of aluminium is deposited from any suitable water-soluble source such as the acidic aluminium salts of mineral acids, e.g. aluminium sulphate and aluminium nitrate or from an alkali metal aluminate such as sodium aluminate.

Usually deposition from an acid aluminium compound is effected in alkaline media e.g. by adding an alkali to an aqueous suspension containing the aluminum compound but if desired the aluminum compound and an alkali can be added simultaneously to the suspension to be treated. Acidification of an alkaline aluminium compound will deposit the hydrous oxide of aluminium and in this procedure simultaneous addition of an alkaline aluminium compound and a mineral acid such as sulphuric acid can be employed.

The provision of an outer coating of an hydrous oxide of aluminum has been found to be advantageous in improving the incorporation and pigmentary properties in paints in certain cases particularly when the amount of hydrous oxide of zirconium is low.

The amount of dense silica is up to 12% by weight of $TiO_2$ and usually will be at least 2% by weight when expressed as $SiO_2$. Most preferred are pigments containing dense silica in amounts of from 4% to 8% by weight as $SiO_2$ on $TiO_2$.

The pigment of the present invention is provided with a coating of an hydrous oxide of zirconium in an amount of up to 5% by weight as $ZrO_2$ on $TiO_2$. Usually the minimum amount of hydrous oxide of zirconium is 0.5% by weight as $ZrO_2$ and particular advantageous amounts of the hydrous oxide are 1% to 4% by weight of $TiO_2$.

The optional outer coating of hydrous alumina can be present in an amount of up to 6% by weight as $Al_2O_3$ on $TiO_2$ with preferably 1% to 3% (expressed as $Al_2O_3$) of hydrous alumina being present.

The amounts of the various reagents usable to produce the pigments of the present invention will be readily ascertainable by those skilled in the coating of pigments as also will the concentrations of the various solutions employed.

After the completion of the coating process the product can be filtered, washed and dried. If desired the product can be milled in a fluid energy mill prior to packing for sale. Alternatively the product can be sold as a highly concentrated slurry or paste.

The product of the invention can be used to pigment a wide variety of materials, particularly those to be exposed to possible photodegradation. Paints incorporating the pigments exhibit a much improved durability as compared with those incorporating pigments coated with dense silica without a coating of an oxide or hydrous oxide of zirconia and also when compared with those incorporating pigments coated with an oxide or hydrous oxide of zirconia and free of dense silica.

The following Examples illustrate the invention.

EXAMPLE 1

Rutile titanium dioxide reactor discharge obtained from the vapour phase oxidation of titanium tetrachloride in the presence of a small amount of aluminium chloride (2% by weight as $Al_2O_3$ in reactor discharge) was agitated with water to produce an aqueous dispersion containing 400 grams per liter of pigment. The dispersion was sieved to remove particles greater than 45 $\mu$m in size.

A portion of the dispersion containing 1200 grams of pigment was diluted to 220 grams per liter pigment and the temperature raised to 70° C. The pH of the dispersion was 3.7.

A quantity (25 mls) of aqueous sodium hydroxide solution containing 110 grams per liter NaOH was then added to the aqueous dispersion to raise the pH to a value of 9.4.

To the stirred aqueous dispersion there was then added aqueous sodium silicate solution (318 mls) containing the equivalent of 166 grams per liter $SiO_2$ simultaneously with 10% v/v sulphuric acid in an amount of 110 mls. The simultaneous addition was completed over a period of 90 minutes and the pH maintained at the value of 9.4 during this time. The aqueous dispersion was then stirred for a further 30 minutes while maintaining at 70° C.

Heating of the stirred aqueous dispersion was then ceased and a quantity (20 mls) of the sulphuric acid added to reduce the pH to 7.5 over a period of 30 minutes.

The aqueous dispersion was then cooled to 50° C. and an aqueous solution of zirconium orthosulphate containing the equivalent of 286 grams per liter $ZrO_2$ was added to reduce the pH to a value of 5.0 and the addition continued simultaneously with a further quantity (145 mls) of the aqueous sodium hydroxide solution to the stirred aqueous dispersion to maintain the pH of the dispersion at a value of 5 during the simultaneous addition. The total amount of zirconium orthosulphate solution added was 46 mls over a total time of 15 minutes. The stirring was continued for a further 10 minutes after completion of the addition.

To the stirred aqueous dispersion there was then added an alkaline solution of sodium aluminate containing the equivalent of 89.3 grams per liter $Al_2O_3$ and 218 grams per liter NaOH until the pH reached 10 to 10.5 and then simultaneously with a further quantity of the sulphuric acid (345 mls) to maintain this pH. After the addition and stirring for a further 45 minutes the pH was found to be 10.7. The total amount of sodium aluminate solution added was 296 mls in a total time of 20 minutes.

The pH of the stirred aqueous dispersion was then adjusted to 6.5 over a period of 30 minutes by adding a further quantity (75 mls) of the sulphuric acid. Mixing was continued for 30 minutes after adding the acid.

The aqueous dispersion was then filtered to obtain the treated pigment which was then washed, treated with trimethylol propane (0.4% by weight on uncoated pigment weight) and dried prior to double milling in a fluid energy mill.

The pigment obtained on analysis contained silica in an amount of 3.85% by weight expressed as $SiO_2$, 1.08% by weight of $ZrO_2$ and 4.68% by weight of $Al_2O_3$ all based on the weight of finished pigment.

EXAMPLE 2

The experiment described in Example 1 was repeated up to and including the addition of the 10% v/v sulphuric acid to reduce the pH to a value of 7.5 and cooling of the aqueous dispersion to 50° C.

To the stirred aqueous dispersion of the pigment which had been treated with the dense amorphous silica there was added a solution prepared by mixing a solution of zirconium orthosulphate containing the equivalent of 286 grams per liter $ZrO_2$ in an amount of 46 mls and a solution of aluminium sulphate containing the equivalent of 93.7 grams per liter $Al_2O_3$ in an amount of 282 mls. The addition was made over a period of 30 minutes and after this had been completed stirring was continued for a further 30 minutes when the pH of the dispersion was 1.9.

A solution (190 mls) of 400 grams per liter NaOH was then added to the stirred dispersion to raise the pH to a value of 6.5 over a period of 30 minutes. Stirring was continued for a further 30 minutes after the pH had attained the value of 6.5.

The treated pigmentary titanium dioxide was filtered, washed, treated with trimethylol propane (0.4% by weight on uncoated pigment) and dried prior to double milling in a fluid energy mill.

The treated pigment obtained on analysis contained silica in an amount of 3.88% by weight $SiO_2$, zirconia in an amount of 0.99% by weight as $ZrO_2$ and alumina 4.44% by weight as $Al_2O_3$ based on weight of finished pigment.

EXAMPLE 3

A portion of an aqueous dispersion containing 1200 grams of a rutile titanium dioxide pigment at a concentration of 220 grams per liter was prepared as described in Example 1.

The aqueous dispersion was heated to 70° C. and the pH adjusted to 9.4 by the addition of 30 mls of 110 grams per liter sodium hydroxide solution.

To the stirred solution there was then added aqueous sodium silicate solution as described in Example 1 in an amount of 318 mls simultaneously with a further quantity of 115 mls of the 10% v/v sulphuric acid over a period of 90 minutes. The pH was maintained at a value of 9.4 during this stage and after addition of the reagents had been completed the dispersion was stirred for a further 30 minutes.

Heating of the dispersion ceased and 25 mls of the sulphuric acid added over a period of 30 minutes to the stirred dispersion to reduce the pH to a value of 7.5.

The dispersion was cooled to 50° C. and sodium aluminate solution containing the equivalent of 89.3 grams per liter $Al_2O_3$ and 218 grams per liter NaOH was added to raise the pH to a value of from 10–10.5 and then simultaneously with 345 mls of the 10% v/v sulphuric acid to maintain the pH at a value of 10 to 10.5. The total amount of sodium aluminate solution added was 286 mls over a total time of 20 minutes. After the additions had been completed the dispersion was stirred for a further 45 minutes when the pH was 10.6 prior to the addition of 85 mls of 10% v/v sulphuric acid to reduce the pH to a value of 6.5 over a period of 30 minutes. The dispersion was stirred for a further 30 minutes after adding the acid.

The treated pigment was then filtered, washed, treated with trimethylol propane (0.4% on weight of uncoated pigment) and dried prior to double milling on a fluid energy mill.

The treated pigment on analysis contained silica in an amount of 3.85% be weight expressed as $SiO_2$, and alumina in an amount of 4.52% by weight as $Al_2O_3$ on the weight of finished pigment.

This pigment was a control pigment.

The pigments produced in the preceding examples were tested to determine the durability ratio of paint incorporating the pigment.

The durability ratio was measured by exposing a sample of an acrylic/melamine formaldehyde stoving paint in a weatherometer and determining the weight loss at specified time intervals. A standard pigment incorporated in a similar paint was similarly exposed and the weight loss of the standard paint determined at the specified time intervals. The weight losses of the paint under test at the various specified intervals were plotted against those of the standard paint and the best straight line drawn. The slope of the line (durability ratio) was then determined.

The standard pigment used in the standard paint to determine the durability ratio was selected from commercially available pigments and was one which was considered to have a high durability and acceptable performance in many applications. The pigment was a rutile titanium dioxide prepared by the sulphate process which had been coated with a hydrous oxide of silica in an amount of 1.3% by weight as $SiO_2$, a hydrous oxide of alumina in an amount of 2% by weight as $Al_2O_3$ and a hydrous oxide of titanium in an amount of 1.5% as $TiO_2$ on the weight of pigment.

The results of the measurements are shown in the following Table.

TABLE 1

| Pigment of Example No. | Durability Ratio |
|---|---|
| 1 | 0.41 |
| 2 | 0.35 |
| 3 | 0.75 |

The above results show that the pigments prepared according to the present invention (Example 1 and Example 2) are superior to the pigment used as a control

EXAMPLE 4

Rutile titanium dioxide reactor discharge was obtained from the vapour phase oxidation of titanium tetrachloride in the presence of a small amount of aluminum chloride (1.4% by weight as $Al_2O_3$ in reactor discharge). Reactor discharge (2200 g) was added to a water/sodium hexametaphosphate/NaOH (110 gpl) mixture which contained sufficient components to achieve final slurry pH 9–11, pigment concentration 700 gpl and 0.1% $P_2O_5$ by weight on reactor discharge. Dispersion was sandmilled with 5140 ml Ottowa sand at 2000 rpm for 60 minutes. Sand was removed from sandmilled slurry using a metal gauge. Sand-free slurry was then filtered to remove any particles greater than 45 μm in size.

A portion of the dispersion containing 1000 grams of pigment was diluted to 220 grams per liter pigment and the temperature raised to 70° C. The pH of the dispersion was adjusted to 9.4 by alkali addition.

To the stirred aqueous dispersion there was then added aqueous sodium silicate solution (140 mls) containing the equivalent of 143 grams per liter $SiO_2$ simultaneously with 10% v/v sulphuric acid in an amount of 30 mls. The simultaneous addition was completed over a period of 45 minutes and the pH maintained at the value of 9.4 during this time. The aqueous dispersion was then stirred for a further 30 minutes while maintaining at 70° C.

Heating of the stirred aqueous dispersion was then ceased and a quantity of the sulphuric acid added to reduce the pH to 7.5 over a period of 30 minutes.

The aqueous dispersion was then cooled to 50° C. and an aqueous solution of zirconium orthosulphate containing the equivalent of 268 grams per liter $ZrO_2$ was added to reduce the pH to a value of 5.0 and the addition continued simultaneously with a further quantity (120 mls) of the aqueous sodium hydroxide solution to the stirred aqueous dispersion to maintain the pH of the dispersion at a value of 5 during the simultaneous addition. The total amount of zirconium orthosulphate solution added was 41 mls over a total time of 15 minutes. The stirring was continued for a further 10 minutes after completion of the addition.

To the stirred aqueous dispersion there was then added an alkaline solution of sodium aluminate containing the equivalent of 93.5 grams per liter $Al_2O_3$ and 225 grams per liter NaOH until the pH reached 10 to 10.5 and then simultaneously with a further quantity of the sulphuric acid to maintain this pH. After the addition and stirring for a further 45 minutes the pH was found to be 10.2. The total amount of sodium aluminate solution added was 235 mls in a total time of 20 minutes.

The pH of the stirred aqueous dispersion was then adjusted to 6.5 over a period of 30 minutes by adding a further quantity of the sulphuric acid. Mixing was continued for 30 minutes after adding the acid.

The aqueous dispersion was then filtered to obtain the treated pigment which was then washed, treated with trimethylol propane (0.4% by weight on uncoated pigment weight) and dried prior to double milling in a fluid energy mill.

The pigment obtained on analysis contained silica in an amount of 1.98% by weight expressed as $SiO_2$, 1.06% by weight of $ZrO_2$ and 3.45 by weight of $Al_2O_3$ all based on the weight of finished pigment.

EXAMPLE 5

The experiment described in Example 4 was repeated except that to the stirred aqueous dispersion having a pH of 9.4 there was then added aqueous sodium silicate solution (420 mls) containing the equivalent of 143 grams per liter $SiO_2$ simultaneously with 10% v/v sulphuric acid in an amount of 140 mls. The simultaneous addition was completed over a period of 90 minutes and the pH maintained at the value of 9.4 during this time. The aqueous dispersion was then stirred for a further 30 minutes while maintaining at 70° C.

Further treatment as described in Example 4 was carried out and the pigment obtained on analysis contained silica in an amount of 5.50% by weight expressed as $SiO_2$, 0.98% by weight of $ZrO_2$ and 3.23% by weight of $Al_2O_3$ all based on the weight of finished pigment.

EXAMPLE 6

The experiment described in Example 4 was repeated except that to the stirred aqueous dispersion having a pH of 9.4 there was then added aqueous sodium silicate solution (560 mls) containing the equivalent of 143 grams per liter $SiO_2$ simultaneously with 10% v/v sulphuric acid in an amount of 185 mls. The simultaneous addition was completed over a period of 120 minutes and the pH maintained at the value of 9.4 during this time. The aqueous dispersion was then stirred for a further 30 minutes while maintaining at 70° C.

The further process stages were repeated to produce a pigment which on analysis contained silica in an amount of 7.30% by weight expressed as $SiO_2$, 0.92% by weight of $ZrO_2$ and 3.14% by weight of $Al_2O_3$ all based on the weight of finished pigment.

EXAMPLE 7

The experiment described in Example 4 was repeated except that to the stirred aqueous dispersion having a pH of 9.4 there was then added aqueous sodium silicate solution (308 mls) containing the equivalent of 143 grams per liter $SiO_2$ simultaneously with 10% v/v sulphuric acid in an amount of 100 mls. The simultaneous addition was completed over a period of 90 minutes and the pH maintained at the value of 9.4 during this time. The aqueous dispersion was then stirred for a further 30 minutes while maintaining at 70° C.

Heating of the stirred aqueous dispersion was then ceased and a quantity (14 mls) of the sulphuric acid added to reduce the pH to 7.5 over a period of 30 minutes.

The aqueous dispersion was then cooled to 50° C. and an aqueous solution of zirconium orthosulphate containing the equivalent of 268 grams per liter $ZrO_2$ was added to reduce the pH to a value of 5.0 and the addition continued simultaneously with a further quantity (12 mls) of the aqueous sodium hydroxide solution to the stirred aqueous dispersion to maintain the pH of the dispersion at a value of 5 during the simultaneous addition. The total amount of zirconium orthosulphate solution added was 7.5 mls over a total time of 10 minutes. The stirring was continued for a further 10 minutes after completion of the addition.

To the stirred aqueous dispersion there was then added an alkaline solution of sodium aluminate containing the equivalent of 93.5 grams per liter $Al_2O_3$ and 225 grams per liter NaOH until the pH reached 10 to 10.5 and then simultaneously with a further quantity of the sulphuric acid (285 mls) to maintain this pH. After the addition and stirring for a further 45 minutes the pH was found to be 10.6. The total amount of sodium aluminate solution added was 235 mls in a total time of 20 minutes.

The pH of the stirred aqueous dispersion was then adjusted to 6.5 over a period of 30 minutes by adding a further quantity (48 mls) of the sulphuric acid. Mixing was continued for 30 minutes after adding the acid.

The aqueous dispersion was then filtered to obtain the treated pigment which was then washed, treated with trimethylol propane (0.4% by weight on uncoated pigment weight) and dried prior to double milling in a fluid energy mill.

The pigment obtained on analysis contained silica in an amount of 4.20% by weight expressed as $SiO_2$, 0.20% by weight of $ZrO_2$ and 3.41% by weight of $Al_2O_3$ all based on the weight of finished pigment.

EXAMPLE 8

The experiment described in Example 4 was repeated and to the stirred aqueous dispersion having a pH of 9.4 there was then added aqueous sodium silicate solution (308 mls) containing the equivalent of 143 grams per liter $SiO_2$ simultaneously with 10% v/v sulphuric acid in an amount of 100 mls. The simultaneous addition was completed over a period of 90 minutes and the pH maintained at the value of 9.4 during this time. The aqueous dispersion was then stirred for a further 30 minutes while maintaining at 70° C.

Heating of the stirred aqueous dispersion was then ceased by a quantity (10 mls) of the sulphuric acid added to reduce the pH to 7.5 over a period of 30 minutes.

The aqueous dispersion was then cooled to 50° C. and an aqueous solution of zirconium orthosulphate containing the equivalent of 268 grams per liter $ZrO_2$ was added to reduce the pH to a value of 5.0 and the addition continued simultaneously with a further quantity (210 mls) of the aqueous sodium hydroxide solution to the stirred aqueous dispersion to maintain the pH of the dispersion at a value of 5 during the simultaneous addition. The total amount of zirconium orthosulphate solution added was 75 mls over a total time of 20 minutes. The stirring was continued for a further 10 minutes after completion of the addition.

To the stirred aqueous dispersion there was then added an alkaline solution of sodium aluminate containing the equivalent of 93.5 grams per liter $Al_2O_3$ and 225 grams per liter NaOH until the pH reached 10 to 10.5 and then simultaneously with a further quantity of the sulphuric acid (260 mls) to maintain this pH. After the addition, the slurry was stirred for a further 45 minutes. The total amount of sodium aluminate solution added was 235 mls in a total time of 20 minutes.

The pH of the stirred aqueous dispersion was then adjusted to 6.5 over a period of 30 minutes by adding a further quantity (60 mls) of the sulphuric acid. Mixing was continued for 30 minutes after adding the acid.

The aqueous dispersion was then filtered to obtain the treated pigment which was then washed, treated with trimethylol propane (0.4% by weight on uncoated pigment weight) and dried prior to double milling in a fluid energy mill.

The pigment obtained on analysis contained silica in an amount of 4.46% by weight expressed as $SiO_2$, 1.73% by weight of $ZrO_2$ and 3.23% by weight of $Al_2O_3$ all based on the weight of finished pigment.

EXAMPLE 9

The experiment described in Example 4 was repeated and to the stirred aqueous dispersion having a pH of 9.4 there was then added aqueous sodium silicate solution (308 mls) containing the equivalent of 143 grams per liter $SiO_2$ simultaneously with 10% v/v sulphuric acid in an amount of 100 mls. The simultaneous addition was completed over a period of 90 minutes and the pH maintained at the value of 9.4 during this time. The aqueous dispersion was then stirred for a further 30 minutes while maintaining at 70° C.

Heating of the stirred aqueous dispersion was then ceased and a quantity (10 mls) of the sulphuric acid added to reduce the pH to 7.5 over a period of 30 minutes.

The aqueous dispersion was then cooled to 50° C. and an aqueous solution of zirconium orthosulphate containing the equivalent of 268 grams per liter $ZrO_2$ was added to reduce the pH to a value of 5.0 and the addition continued simultaneously with a further quantity (100 mls) of the aqueous sodium hydroxide solution to the stirred aqueous dispersion to maintain the pH of the dispersion at a value of 5 during the simultaneous addition. The total amount of zirconium orthosulphate solution added was 41 mls over a total time of 20 minutes. The stirring was continued for a further 10 minutes after completion of the addition.

To the stirred aqueous dispersion there was then added an alkaline solution of sodium aluminate containing the equivalent of 93.5 grams per liter $Al_2O_3$ and 225 grams per liter NaOH until the pH reached 10 to 10.5 and then simultaneously with a further quantity of the sulphuric acid (250 mls) to maintain this pH. After the addition, the slurry was stirred for a further 45 minutes. The total amount of sodium aluminate solution added was 320 mls in a total time of 20 minutes.

The pH of the stirred aqueous dispersion was then adjusted to 6.5 over a period of 30 minutes by adding a further quantity (60 mls) of the sulphuric acid. Mixing was continued for 30 minutes after adding the acid.

The aqueous dispersion was then filtered to obtain the treated pigment which was then washed, treated with trimethylol propane (0.4% by weight on uncoated pigment weight) and dried prior to double milling in a fluid energy mill.

The pigment obtained on analysis contained silica in an amount of 3.87% by weight expressed as $SiO_2$, 0.96% by weight of $ZrO_2$ and 3.10% by weight of $Al_2O_3$ all based on the weight of finished pigment.

EXAMPLE 10

The experiment described in Example 1 was repeated up to and including the addition of the 10% v/v sulphuric acid to reduce the pH to a value of 7.5 and cooling of the aqueous dispersion to 50° C.

To the stirred aqueous dispersion of the pigment which had been treated with the dense amorphous silica there was added a solution of zirconium nitrate containing the equivalent of 20% by weight of $ZrO_2$ in an amount of 55 g. The addition was made over a period of 15 minutes and after this had been completed stirring was continued for a further 10 minutes when pH of the dispersion was 2.2. A solution of aluminum sulphate containing the equivalent of 90.0 grams per liter $Al_2O_3$ and 255 grams per liter $H_2SO_4$ was then added over a period of 20 minutes. After this had been completed, stirring was continued for a further 10 minutes when pH of the dispersion was 1.5.

A solution (145 mls) of 400 grams per liter NaOH was then added to the stirred dispersion to raise the pH to a value of 6.5 over a period of 30 minutes. Stirring was continued for a further 30 minutes after the pH had attained the value of 6.5.

The treated pigmentary titanium dioxide was filtered, washed, treated with trimethylol propane (0.4% by weight on uncoated pigment) and dried prior to double milling in a fluid energy mill.

The treated pigment obtained on analysis contained silica in an amount of 4.19% by weight $SiO_2$, zirconia in an amount of 0.91% by weight as $ZrO_2$ and alumina 3.26% by weight as $Al_2O_3$ based on weight of finished pigment.

EXAMPLE 11

The experiment described in Example 4 was repeated and to the stirred solution there was then added aqueous sodium silicate solution as described in Example 1 in an amount of 308 mls simultaneously with a further quantity of 95 mls of the 10% v/v sulphuric acid over a period of 90 minutes. The pH was maintained at a value of 9.5 during this stage and after addition of the reagents had been completed the dispersion was stirred for a further 30 minutes.

Heating of the dispersion ceased and 15 mls of the sulphuric acid added over a period of 30 minutes to the stirred dispersion to reduce the pH to a value of 7.5.

The dispersion was cooled to 50° C. and sodium aluminate solution containing the equivalent of 93.5 grams per liter $Al_2O_3$ and 225 grams per liter NaOH was added to raise the pH to a value of from 10–10.5 and then simultaneously with 290 mls of the 10% v/v sulphuric acid to maintain the pH at a value of 10 to 10.5. The total amount of sodium aluminate solution added was 235 mls over a total time of 20 minutes. After the additions had been completed the dispersion was stirred for a further 45 minutes when the pH was 10.4 prior to the addition of 10% v/v sulphuric acid to reduce the pH to a value of 6.5 over a period of 30 minutes. The dispersion was stirred for a further 30 minutes after adding the acid.

The treated pigment was then filtered, washed, treated with trimethylol propane (0.4% on weight of uncoated pigment) and dried prior to double milling on a fluid energy mill.

The treated pigment on analysis contained silica in an amount of 4.31% by weight expressed as $SiO_2$, and alumina in an amount of 3.42% by weight as $Al_2O_3$ on the weight of finished pigment.

This pigment was a control pigment for the Examples 4 to 10.

The pigments produced in Examples 4 to 11 were tested, as described previously to determine the durability ratio of paint incorporating the pigment.

The results of the measurements are shown in the following Table 2.

TABLE 2

| Pigment of Example No. | Durability Ratio |
|---|---|
| 4 | 0.46 |
| 5 | 0.33 |
| 6 | 0.25 |
| 7 | 0.46 |
| 8 | 0.29 |
| 9 | 0.27 |
| 10 | 0.44 |
| 11 | 0.86 |

These results show quite conclusively the substantially improved durability of pigments of the present invention.

What is claimed is:

1. Titanium dioxide pigment which comprises pigmentary titanium dioxide having (i) an inner coating on a core of rutie titanium dioxide of dense, amorphous silica in an amount of from about 2% to about 12% by weight, expressed as $SiO_2$ by weight of $TiO_2$; (ii) carried on said inner coating, a second coating of a hydrous oxide of zirconium in an amount of from about 1% to about 4% by weight, expressed as $ZrO_2$ by weight of $TiO_2$; and (iii) an outer coating containing a hydrous oxide of aluminum in an amount of from about 1% to about 6% by weight, expressed as $Al_2O_3$ by weight of $TiO_2$.

2. Titanium dioxide pigment according to claim 1 in which the amount of dense amorphous silica is from 4% to 8% by weight expressed as $SiO_2$ on weight of $TiO_2$.

3. Titanium dioxide pigment according to claim 1 in which the optical outer coating of hydrous alumina is present in an amount of from 1% to 3% expressed as $Al_2O_3$ on weight of $TiO_2$.

4. A process for the manufacture of titanium dioxide pigment which comprises (i) forming an aqueous dispersion of a particulate core material comprising rutile titanium dioxide in admixture with a water-soluble silicate and depositing at a pH greater than 8 a dense, amorphous inner coating of silica on the core material in amount of from about 2% to about 12% by weight, expressed as $SiO_2$ by weight of $TiO_2$; (ii) depositing on said inner coating a second coating of a hydrous oxide of zirconium in an amount of from about 1% to about 4% by weight, expressed as $ZrO_2$ by weight of $TiO_2$; and (iii) depositing an outer coating of hydrous alumina on said pigment after deposition of said hydrous oxide of zirconium in an amount of from about 1% to about 6% by weight, expressed as $Al_2O_3$ by weight of $TiO_2$.

5. A process according to claim 4 in which the rutile titanium dioxide particulate core material is obtained by the vapour phase oxidation of titanium tetrachloride.

6. A process according to claim 4 in which the rutile titanium dioxide core material is a calcined pigment obtained by the "sulphate" process.

7. A process according to claim 4 in which the core material is milled prior to coating with said inner coating of dense amorphous silica.

8. A process according to claim 7 in which the milling is carried out by sand milling.

9. A process according to claim 4 in which the aqueous dispersion of the core material is mixed with an alkaline solution of a silicate and to which is then added a mineral acid to deposit the said dense amorphous coating while maintaining the pH at a value greater than 8.

10. A process according to claim 4 in which the aqueous dispersion of the core material is mixed simultaneously with an aqueous alkaline solution of a silicate and a mineral acid in amounts such that the pH is maintained at a value greater than 8 to deposit said dense amorphous silica.

11. A process according to claim 4 in which the temperature is maintained at a value of from 70° C. to 90° C. and the pH at a value of from 9 to 10.5 during deposition of said dense amorphous silica.

* * * * *